Dec. 23, 1969          D. M. BROWN          3,485,252

AIR INTAKE DUCT FOR A GAS TURBINE ENGINE

Filed April 6, 1967

Inventor
David Morris Brown
By
Cushman, Darby & Cushman
Attorneys

United States Patent Office 3,485,252
Patented Dec. 23, 1969

3,485,252
AIR INTAKE DUCT FOR A GAS TURBINE ENGINE
David Morris Brown, Allestree, Derby, England, assignor to Rolls-Royce Limited, Derby, England, a British company
Filed Apr. 6, 1967, Ser. No. 628,902
Claims priority, application Great Britain, Apr. 26, 1966, 18,313/66
Int. Cl. F02b 27/02; F02k 1/26; B64d 33/02
U.S. Cl. 137—15.1                                6 Claims

ABSTRACT OF THE DISCLOSURE

An air inlet duct to selectively reduce downward transmission of compressor-generated noise or the like therefrom, the air inlet duct being for a gas turbine engine and at whose upstream end the bottom of the duct is extensible forwardly of the top thereof, thereby rendering the plane of the inlet of the duct oblique to the engine axis to reduce the noise by blocking the egress of noise transmitted downwards from the air inlet duct.

This invention concerns an air intake duct for a gas turbine engine, the intake duct having an inlet lying in a plane which may be selectively changed to reduce compressor-generated noise or the like from the engine.

According to the present invention, there is provided an air intake duct for a gas turbine engine having a movable part at its upstream end and a fixed part, the movable part being pivotally connected to the fixed part for pivotal movement about an axis adjacent the periphery of the duct between an inoperative position in which the inlet of the air intake duct lies in a plane making a first angle with the longitudinal axis of the duct and an operative position in which the bottom of the inlet is disposed forwardly of the top thereof and the inlet lies in a plane making a second angle with the said axis, the second angle being smaller than the first angle.

It is intended that the aforementioned first and second angles be measured from the duct axis in a counterclockwise direction.

Considerable engine noise, produced by th engine compressor, normally escapes through the air intake duct of a gas turbine engine. Since, by means of the present invention, the plane of the inlet of the air intake duct is, or may be rendered, oblique to the engine axis, this noise is attenuated so far as a person situated below the engine is concerned.

The said movable part may be movable into an inoperative position in which the said plane is at right angles to the engine axis.

Thus the movable part may be pivotally connected to the said downstream part at the top of the air intake duct, the bottom of the movable part being movable towards and away from the bottom of the said downstream part, and means being provided for closing the gap between the said parts in the said operative position so as to reduce the egress of noise therebetween.

Alternatively the movable part may be pivotally connected to the said fixed part at the bottom of the air intake duct. In this case, the said plane may always be oblique to the engine axis, the movable part, when in the operative position, increasing the obliquity of the said plane.

The invention also comprises a gas turbine engine provided with an air intake duct as set forth above.

Figure 1:
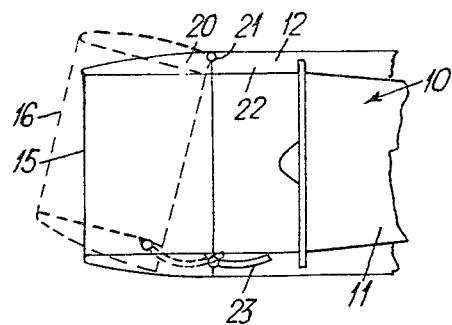
Figure 2:
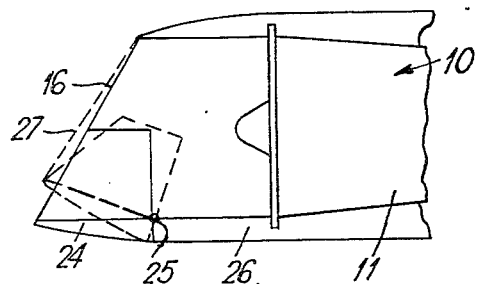

The invention is illustrated, merely by way of example, in the accompanying drawings, in which:

FIGURES 1 and 2 are diagrammatic side elevations of alternative air intake ducts according to the present invention.

In FIGURE 1 there is shown a gas turbine engine 10 having a compressor 11 the air for which passes through an air intake duct 12.

At the upstream end of the air intake duct 12, there is provided a fully cylindrical movable part 20. The movable part 20 is pivotally connected, at a pivot 21 which is disposed at the top of the air intake duct 12, to the remaining part 22 of the air intake duct.

The movable part 20 is pivotally movable (by means not shown) between an inoperative position shown in full lines and an operative position shown in dotted lines. In the inoperative position, the parts 20, 22 are disposed in contact with each other with the result that the inlet of the air inlet duct lies in the plane 15 which is normal to the duct axis which is also the engine axis. In the operative position, however, the bottom of the movable part 20 is moved away from the bottom of the remaining part 22 of the air inlet duct 12, with the result that the inlet of the air inlet duct now lies in the plane 16 which is oblique to the duct axis.

The movable part 20 carries a part-cylindrical shield member 23 which engages the remaining part 22 of the air inlet duct 12 so that, when the movable part 20 is in the operative position, the shield 23 closes the gap between the parts 20, 22 so as to reduce the egress of noise therethrough.

In FIGURE 2 there is shown an air intake duct 12, whose inlet normally lies in a plane 16 which is oblique to the duct axis.

In the FIGURE 2 construction, however, the air intake duct 12 has a part cylindrical movable part 24 which is pivotally connected at a pivot 25, which is disposed at the bottom of the air intake duct, to the remaining part 26 of the air intake duct.

The movable part 24 is thus pivotally movable (by means not shown) between an inoperative position, shown in full lines, in which it merges into the remaining part 26 of the air intake duct 12, and an operative position, shown in dotted lines, in which the inlet of the air inlet now lies in a plane 27 whose obliquity to the engine axis is greater than that of the plane 16. Thus at takeoff and landing of an aircraft to which the invention is fitted, the above members 20 and 24 are pivoted into the operative position shown in chain dotted lines in FIGURES 1 and 2 so that the bottom of the air intake duct 12 extends forwardly of the top thereof. The inlet of the air inlet duct 12 will then be in the plane 16 which is oblique to the duct axis, and the noise which normally escapes through the said inlet will therefore be substantially attenuated so far as a person vertically beneath the engine 10 is concerned. During flight, however, the members are pivoted into their full line positions so that the inlet of the air inlet duct 12 lies in the plane 15 which is normal to the duct axis. Extension of the bottom of the air inlet duct forwardly relative to the top thereof attenuates the engine noise so far as a person situated beneath the engine is concerned, the attenuation being greater the greater the obliquity.

I claim:

1. In an aircraft an air intake duct to selectively reduce downward transmission of compresser-generated noise or the like therefrom of a gas turbine engine, said duct having an air inlet and comprising a movable part and a fixed part, said movable part being pivotally connected to said fixed part for pivotal movement about an axis on an edge of the duct between an inoperative position in which said inlet of the air intake duct lies in a plane making a first angle with a longitudinal axis of the duct and an operative position in which the bottom of the inlet is disposed forwardly of the top thereof for reducing compressor-generated noise or the like from the inlet, viewing said aircraft in an upright position, said inlet when in said operative position lying in a plane making a second angle with said longitudinal axis, said second angle being smaller than said first angle in a counterclockwise direction from said longitudinal axis.

2. An air intake duct as claimed in claim 1 in which the said first angle is substantially ninety degrees.

3. An air intake duct as claimed in claim 1 in which said fixed part is downstream of said movable part.

4. An air intake duct as claimed in claim 3 in which the movable part is pivotally connected to the said downstream part at the top of the air intake duct, the bottom of the movable part being movable towards and away from the bottom of the said downstream part, and means for closing a gap between said parts when in said operative position, thus reducing the egress of noise, therebetween.

5. An air intake duct as claimed in claim 1 in which the movable part is pivotally connected to the said fixed part at the bottom of the air intake duct.

6. An air intake duct as claimed in claim 5 in which the said first angle is always less than ninety degrees.

References Cited

UNITED STATES PATENTS 2,932,945  4/1960  Brandt.
2,944,765  7/1960  Lane.
3,141,297  7/1964  Shields.

ALAN COHAN, Primary Examiner